United States Patent [19]

Grewell

[11] Patent Number: 5,788,791

[45] Date of Patent: Aug. 4, 1998

[54] METHOD OF DETERMINING THE COLLAPSE OF PLASTIC PARTS

[75] Inventor: David A. Grewell, Waterbury, Conn.

[73] Assignee: Branson Ultrasonics Corporation, Danbury, Conn.

[21] Appl. No.: 674,905

[22] Filed: Jul. 3, 1996

[51] Int. Cl.$^6$ .......................... B32B 31/20; G06F 19/00
[52] U.S. Cl. .............. 156/73.1; 156/308.2; 156/309.6; 156/368; 156/378; 364/476.01; 364/477.06; 364/551.02
[58] Field of Search .................... 156/73.1, 351, 156/368, 378, 580.1, 308.2, 309.6; 100/50, 99; 364/476.01, 551.02, 552, 477.06

[56] References Cited

U.S. PATENT DOCUMENTS

| | | | |
|---|---|---|---|
| 3,257,652 | 6/1966 | Foster | 364/552 |
| 3,920,504 | 11/1975 | Shoh et al. | |
| 4,631,685 | 12/1986 | Peter | |
| 4,750,131 | 6/1988 | Martinez | 364/552 |
| 5,160,393 | 11/1992 | Snyder | |
| 5,435,863 | 7/1995 | Frantz | |
| 5,443,240 | 8/1995 | Cunningham | |
| 5,491,647 | 2/1996 | O'Brien et al. | 364/551.02 |

*Primary Examiner*—Richard Crispino
*Attorney, Agent, or Firm*—Polster, Lieder, Woodruff & Lucchesi

[57] ABSTRACT

For accurately determining, in real time, the collapse of a thermoplastic workpiece processed in a press, such as an ultrasonic welding apparatus or a vibration welding apparatus, a two-phase method is used. In the calibration phase signals are generated which are responsive to the yielding or displacement of the movable press portion relative to the substantially stationary portion arising from forced engagement of the workpiece within the press. The force responsive displacement value is stored.

In the subsequent workpiece processing phase, when the workpiece collapses due to the softening and flowing of thermoplastic material as the workpiece is coupled to vibrations, the previously stored force responsive displacement value is recalled as a correction signal and subtracted from the newly obtained displacement signal related to the same force. The result of the subtraction is a true on-line signal indicative of the collapse of the workpiece as it occurs.

6 Claims, 4 Drawing Sheets

METHOD OF DETERMINING THE COLLAPSE OF PLASTIC PARTS

SUMMARY

This invention relates to a method and apparatus for processing plastic parts and more particularly concerns a method and apparatus for accurately monitoring the collapse of a thermopastic workpiece during processing, such as welding or upsetting, using vibratory energy in the sonic or ultrasonic frequency range, or other energy suitable for this purpose.

When a workpiece comprising two thermoplastic parts is welded in a vibration welding apparatus or in an ultrasonic welding apparatus, the two parts are mated along a common interface surface. While the two parts are in forced contact along such interface surface, sonic or ultrasonic vibrations are applied to at least one of the parts and the resulting dissipation of vibratory energy causes a softening and flowing of the thermoplastic material along the interface surface. Upon the cessation of vibratory energy the softened material solidifies, thus providing a weld which joins the parts. The staking or riveting process is very similar in that an upstanding thermoplastic stud is reshaped at its upper end responsive to the application of vibratory energy to form a head or the softened material is urged to flow and fill a recess, thereby fastening two parts to one another.

The softening and flowing of thermoplastic material during such processing causes a reduction of the height of the workpiece, generally referred to as collapse, thereby causing the processed workpiece to have a reduced height. In recent times, the dimensional uniformity of workpieces so processed has assumed increased importance as is apparent from U.S. Pat. No. 4,631,685 dated Dec. 23, 1986, issued to David A. Peter, entitled "Method and Apparatus for Ultrasonic Plastic Forming and Joining". This patent discloses a method and apparatus wherein the collapse of the workpiece, which is welded in an ultrasonic apparatus, is checked and if the collapse is within established limits, the workpiece is accepted and if the relapse falls outside of established limited the workpiece is rejected. It will be apparent that in this prior art arrangement the determination of an acceptable or rejected workpiece is made after the workpiece has been completed.

The present invention discloses means for controlling the collapse of the workpiece during processing, thereby improving the dimensional uniformity of welded or upset workpieces. The process control method disclosed hereafter has attained greater importance as a result of recent discoveries that weld strength of a thermoplastic workpiece joined in an ultrasonic welding apparatus is improved by varying the motional amplitude of the horn during the weld time interval, see U.S. Pat. No. 5,435,863 dated Jul. 25, 1995, issued Jeffrey L. Frantz, or by varying the applied force during such interval. The change in amplitude or force has been termed respectively amplitude profiling and force profiling.

Investigations have revealed that the collapse of a thermoplastic workpiece during such processing involves two components, namely the actual or true collapse of the workpiece as a result of melting and flowing of thermoplastic material, and the force responsive yielding or relative displacement of the press parts, i. e. the stationary portion and the movable portion, within which the workpiece is confined during processing.

For instance, an ultrasonic welding apparatus, also known as press, comprises a stationary support or base and an upstanding column along which a movable carriage is fixedly secured. The carriage includes a fluid pressure responsive reciprocatingly movable slide which supports an electroacoustic transducer to which is coupled an intermediate horn (booster horn) and an output horn, also known as tool, resonator, etc. A workpiece to be welded or otherwise to be processed is disposed in a fixture on the stationary base and the upper free surface of the workpiece is forcibly engaged by the horn for applying to the workpiece ultrasonic energy in the form of high frequency vibrations.

An apparatus of this type usually is "C"-shaped and as a result of the forced engagement between the horn and workpiece the upstanding column is subjected to a bending moment. Other portions of the apparatus may yield also, thus undergoing a motion which can be monitored as a linear mechanical displacement of the slide relative to the fixedly secured carriage or base. Measurements taken on commercially available equipment have shown that such displacements may be in the range of 0.5 mm or more, which displacements in certain instances exceed the collapse distance of the workpiece.

The present invention concerns a method and apparatus for determining by means of a calibration procedure the pressure responsive displacement of the press portions before a workpiece is processed, such as being welded or upset, storing the pressure responsive signal obtained during calibration, and recalling the stored signal as a correction signal when determining the actual collapse of a workpiece during processing. It is possible, therefore, to change the motional amplitude of the horn, change the engagement force or terminate processing of a workpiece in response to a desired dimension having been achieved.

In an ultrasonic welding apparatus the true collapse distance of a workpiece equals the displacement distance from TRS minus the apparatus displacement resulting from pressure. TRS is defined as the point at which the workpiece is engaged by the horn and sonic energy is activated, starting the collapse.

A principal object of this invention, therefore, is the provision of a new and improved method and apparatus for processing thermoplastic workpieces for achieving greater dimensional uniformity and consistency of the processed pieces.

Another important object of this invention is the provision of a method and apparatus for accurately determining the collapse of a thermoplastic workpiece during processing by sonic or ultrasonic energy.

A further object of this invention is the provision of a method and apparatus for improving the dimensional accuracy and consistency of welded or upset thermoplastic workpieces by providing a calibration process for determining the pressure responsive relative displacement between the movable and the stationary portions of an ultrasonic press or vibration welding apparatus, providing a signal or signals responsive to one or more pressure responsive displacements, storing such signal or signals as a correction signal, and recalling such stored signal or signals when a thermoplastic workpiece is processed and its collapse is monitored.

Still further and other objects of this invention will become more clearly apparent from the following description when taken in conjunction with the accompanying drawings wherein like reference numerals refer to like parts.

DETAILED DESCRIPTION

Figure 1:
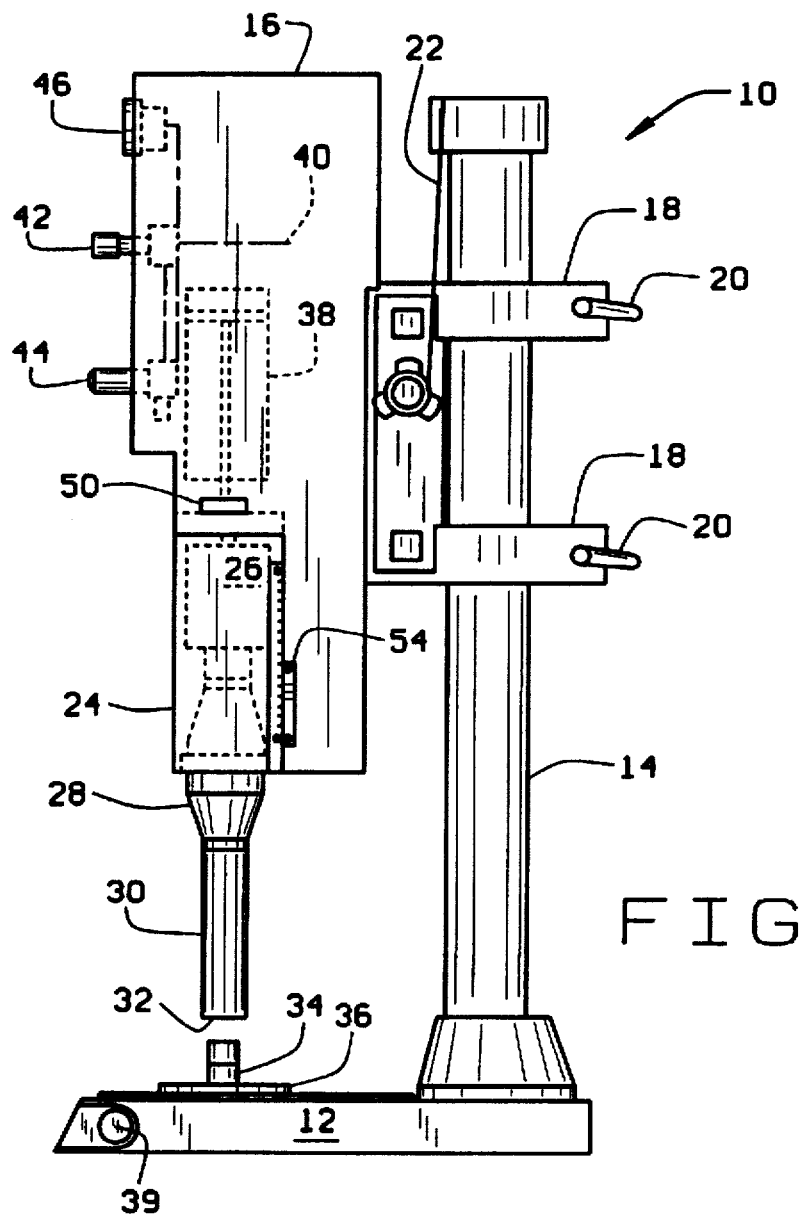
FIG. 1 is a schematic vertical view of an ultrasonic apparatus for joining or upsetting thermoplastic workpieces.

Referring now to the figures and FIG. 1 in particular, there is shown, in schematic form, an ultrasonic welding apparatus or ultrasonic press 10 comprising a stationary support or base 12 from which extends a vertical column 14 and along which is positioned a carriage 16 having a set of brackets 18 which engage the column 14. By means of screws 20 the carriage 16 is clamped at an adjustable height against the column 14. A tension spring 22, whose tension is adjustable, serves as counterbalance for the carriage to facilitate positioning the carriage along the column.

The carriage includes also a reciprocatingly movable slide 24 which supports an electroacoustic converter unit or transducer 26 to which is mechanically coupled an intermediate or booster horn 28 and to which is coupled another horn 30 whose output surface 32 during welding or upsetting is brought into forced engagement with a thermoplastic workpiece 34 disposed in a fixture 36 which rests on the top surface of the base 12. The reciprocating motion of the slide 24 for causing forced engagement between the output surface 32 of the horn 30 and the workpiece 34 for providing ultrasonic vibrations to the workpiece 34 to effect welding or upsetting of the workpiece, is effected by a fluid operated cylinder and piston assembly 38. The piston is coupled to the slide and the motion of the piston is responsive to the fluid pressure supplied from line 40 to a pressure regulator 42 and via a flow control valve 44 to the cylinder and piston assembly 38. There is connected also a pressure gauge 46 in the line from the valve 44 to the cylinder. The fluid pressure circuit is shown schematically since the operation of a fluid pressure controlled cylinder and piston assembly to effect reciprocating motion of a slide supporting a tool, such as a transducer and horn assembly shown, is well understood. For the purpose of the present invention, the pressure regulator 42 and the flow control valve 44 may be manually or electrically controlled devices.

Operation of the apparatus is initiated by a set of manually operable pushbutton 39, only one being visible in FIG. 1, which act on a conventional control circuit which controls the operation of the fluid circuit and of the electrical power supply, not shown, to cause the horn to be in compressive force contact with the workpiece and the horn to be rendered resonant, coupling ultrasonic vibrations to the workpiece. The vibrations are applied for a time interval ranging from a fraction of a second to one second or more, followed by a hold or dwell interval during which the softened and flowed material solidifies.

In connection with the present invention, there are provided two sensing means, namely an electronic force sensor 50, i.e. a strain gauge, whose output is responsive to the mechanical force effective upon the slide 24 and thereby being a measure of the engagement force between the horn surface 32 and the workpieces 34, and a linear motion displacement sensor 54, typically an electric or opto-electric device, which provides a signal indicative of the pressure induced displacement of the slide 24 with respect to the relatively stationary support structure comprising the base 12, column 14 and fixedly secured carriage 16. This press displacement is measured as a linear motion along an axis substantially parallel to the linear dimension change of the workpiece as the workpiece collapses.

As has been explained heretofore, the apparent collapse of the workpiece measured during welding or upsetting is not only responsive to the displacement and flowing of thermoplastic material, but is affected also by the yielding or elasticity of the apparatus structure. As can be seen from FIG. 1, when the horn is urged into forced engagement with the workpiece, given the "C"-shaped structure of the press, there is a bending moment in the clockwise direction acting upon column 14, the moment, inter alia, being a function of the engagement pressure between the horn and workpiece, the vertical position of the carriage 16 along the column 14, and the stability of the column. In addition, there may exist mechanical play among the components. If during the weld cycle and subsequent hold interval the pressure between the horn and workpiece remains constant, the displacement of the apparatus structure will remain constant. However, if the pressure is varied during the weld and hold (dwell) intervals, the displacement of the apparatus will vary also.

Figure 2:
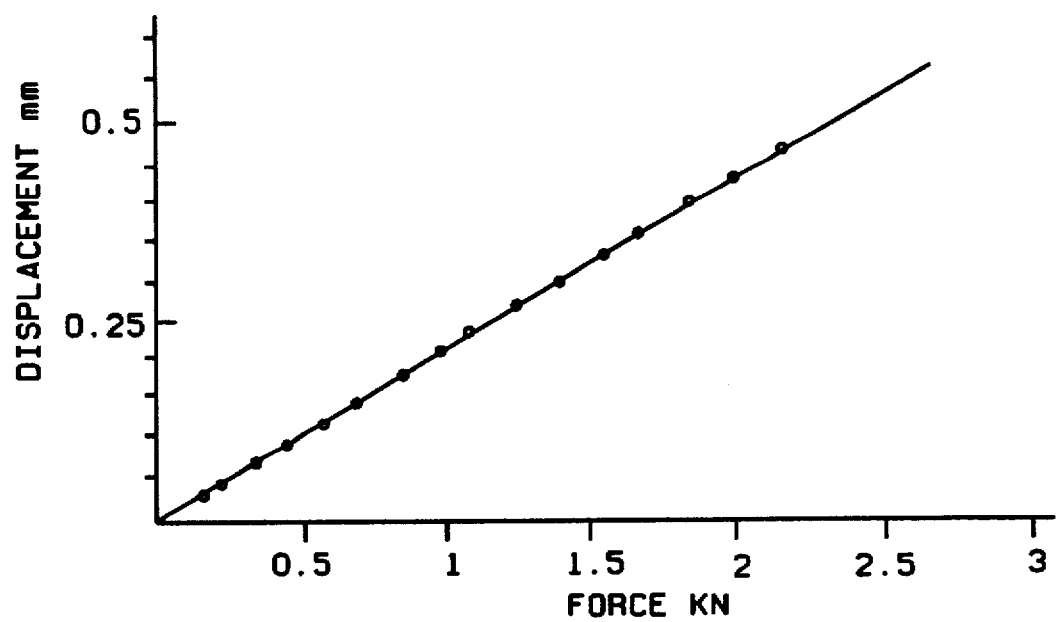
FIG. 2 is a graph showing displacement inherent in an apparatus per FIG. 1 as a function of the engagement force between a horn and a stationary part of the apparatus.

In order to monitor and determine the true collapse of a workpiece during the time in which the workpiece is welded or upset, and to optionally terminate the welding or upsetting process when a desired amount of collapse has been achieved, it is necessary to eliminate from this determination the force responsive displacement inherent in the press. The importance of this step is evident from FIG. 2. A typical ultrasonic welding apparatus was used to measure the system displacement between zero and 2.7 kN force for a given stroke length and carriage location. The column had an outside diameter of 102 mm and an inside diameter of 76 mm, the stroke length was 19 mm, a booster horn with a gain ratio of 1:2.0 was used mounted in a standard "O"-ring mount (U.S. Pat. No. 5,443,240 FIG. 1), an output horn coupled to the booster horn, and no workpiece, causing the output surface of the horn to be in metal-to-metal contact with the fixture on the base. It will be observed that the displacement was substantially linear with force, but exceeding 0.5 mm at a force of 2.5 kN. This displacement value is significant when accurately controlling the collapse of a workpiece.

This invention, therefore, comprises a first step which is the calibration phase during which data related to the displacement of the welder or press as a function of force are determined and stored, and a second workpiece processing phase during which the workpiece height collapses and pertinent data stored are recalled from storage and used for correcting the apparent collapse distance to obtain the true or accurate collapse distance.

This calibration procedure will be explained in connection with the ultrasonic welding apparatus shown in FIG. 1. In order to effect accurate calibration an actual workpiece or a workpiece substantially representative of the actual workpiece is placed on the fixture 36 and the booster horn 28 and output horn 30 are substantially the same horns used for processing. Also, the carriage 16 is set to its operative position.

Figure 3:
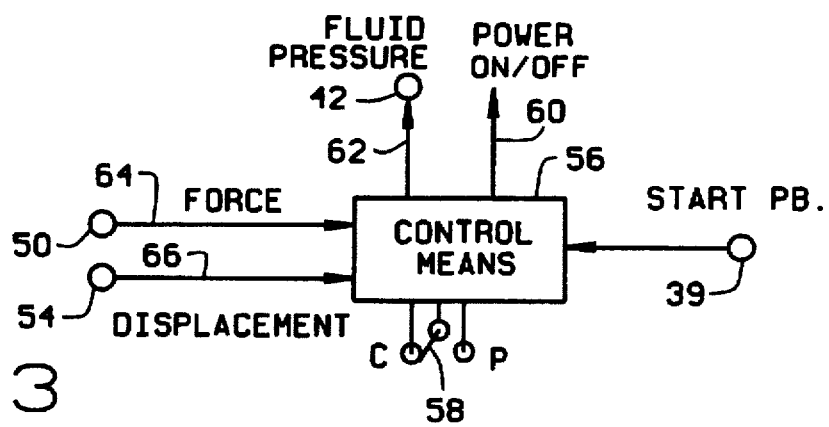
FIG. 3 is a schematic block diagram of the control means for operating an ultrasonic welding apparatus.
Figure 4A:
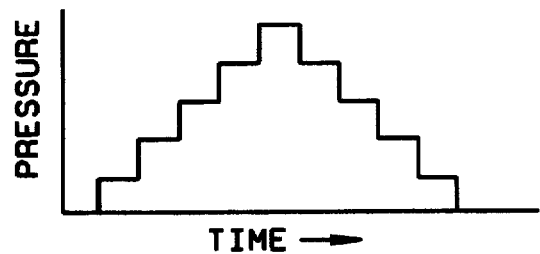
FIG. 4 (A)–(C) are graphs showing the signals developed during the calibration phase pertaining to the apparatus.
Figure 4B:
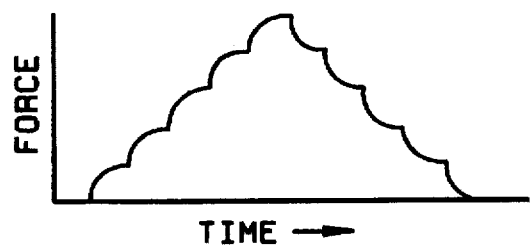
Figure 5:
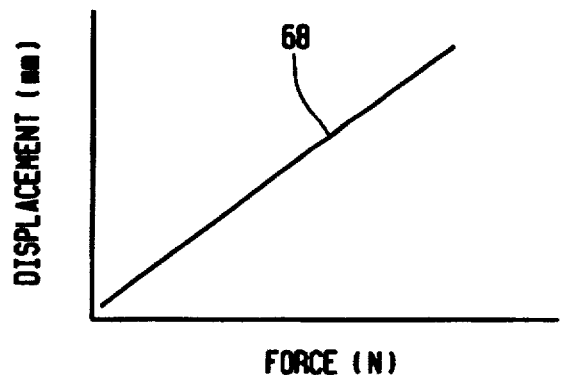
FIG. 5 is a graph showing displacement developed during the calibration phase.
Figure 6:
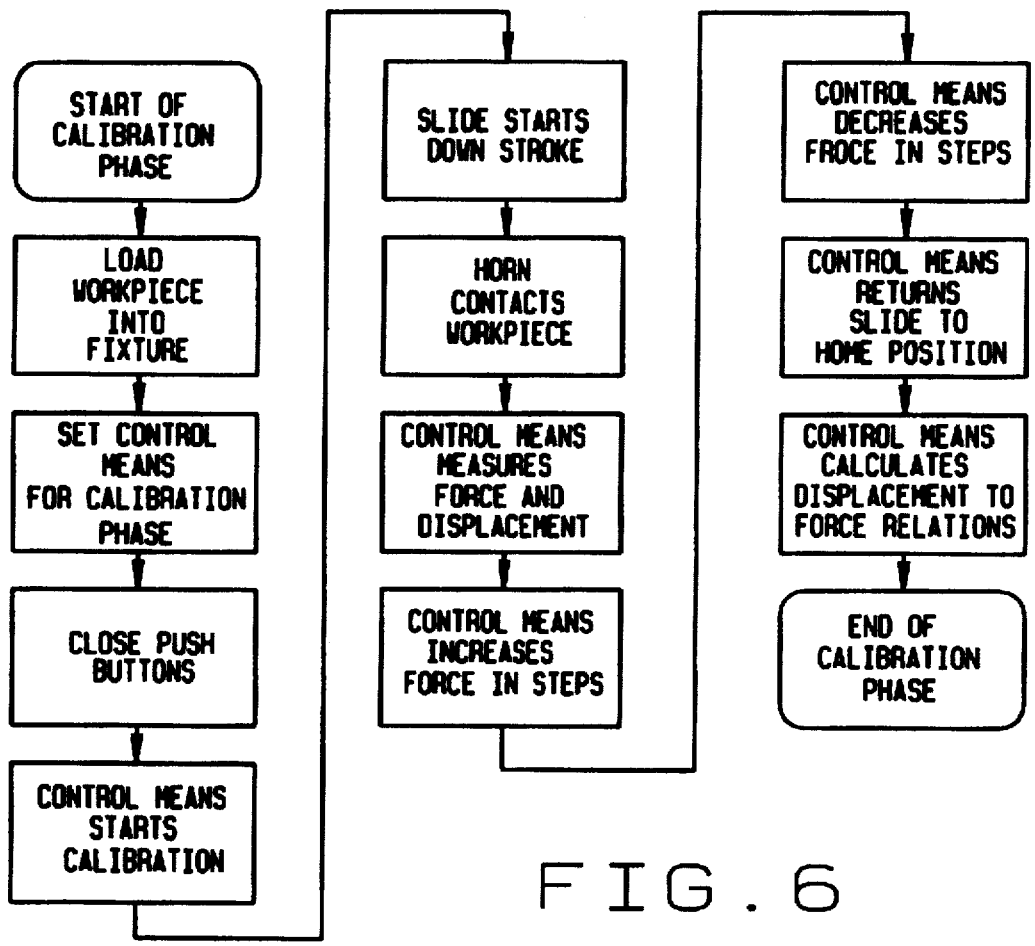
FIG. 6 is a flow diagram setting forth the steps occurring during the calibration phase.

Referring now to FIG. 3, there is shown in block form a control means 56 used for controlling the operation of the welder 10. The control means has a selector switch 58 for selecting "C", the calibration procedure, or selecting "P", the processing phase. In the position "C" the signal to the power supply, conductor 60, remains de-energized as no energy is applied to the workpiece. Upon operating the start pushbuttons 39 the control means 56 provides via conductor 62 to the pressure regulator 42, an electrically controlled device, signals for causing a programmed time-stepped increase and decrease of the pressure effective upon the piston which, in turn, causes forced engagement between the horn and the workpiece at varying pressures, see FIG. 4a. Pressure responsive signals are generated at the force sensing means 50 and the linear displacement sensing means 54, FIG. 4(b) and (c), which signals are transmitted via conductors 64 and 66 to the control means 56 for processing. The result of the two inputs can be plotted as a line 68, displacement versus force, as seen in FIG. 5, which figure is similar to FIG. 2. Instead of an automatic procedure, the displacement versus force data can be developed also manually. The force and displacement readings are recorded when a steady state condition has been attained during each pressure setting and for this purpose a clock signal, not shown, may be used for entering the respective values near the end of respective dwell periods. Alternatively, readings can be entered responsive to no further value change being noted. FIG. 6 is a schematic flow diagram setting forth the major steps comprising the calibration phase. When readings are obtained from individual pressure steps, a central processing unit (CPU) in the control means 56 may be used to calculate intermediate force/displacement data applicable to intermediate pressure conditions.

Figure 7:
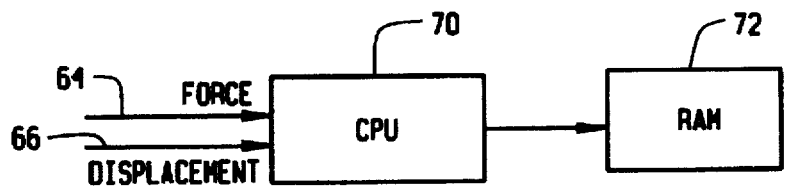
FIG. 7 is a schematic electrical circuit block diagram.

As seen from FIG. 7, the force and displacement responsive signals 64 and 66 are received in a central processing unit 70 which builds a two-dimensional array or deflection array, i.e. each force value being correlated with a respective displacement value and these values are entered for storage in a random access memory 72 (RAM). In other words, each displacement value stored is correlated with a respective force value and is called up by addressing the respective force value.

It should be noted that for the sake of accuracy the calibration procedure should be repeated when there is a change in the workpiece, fixture or welding apparatus.

Figure 8:
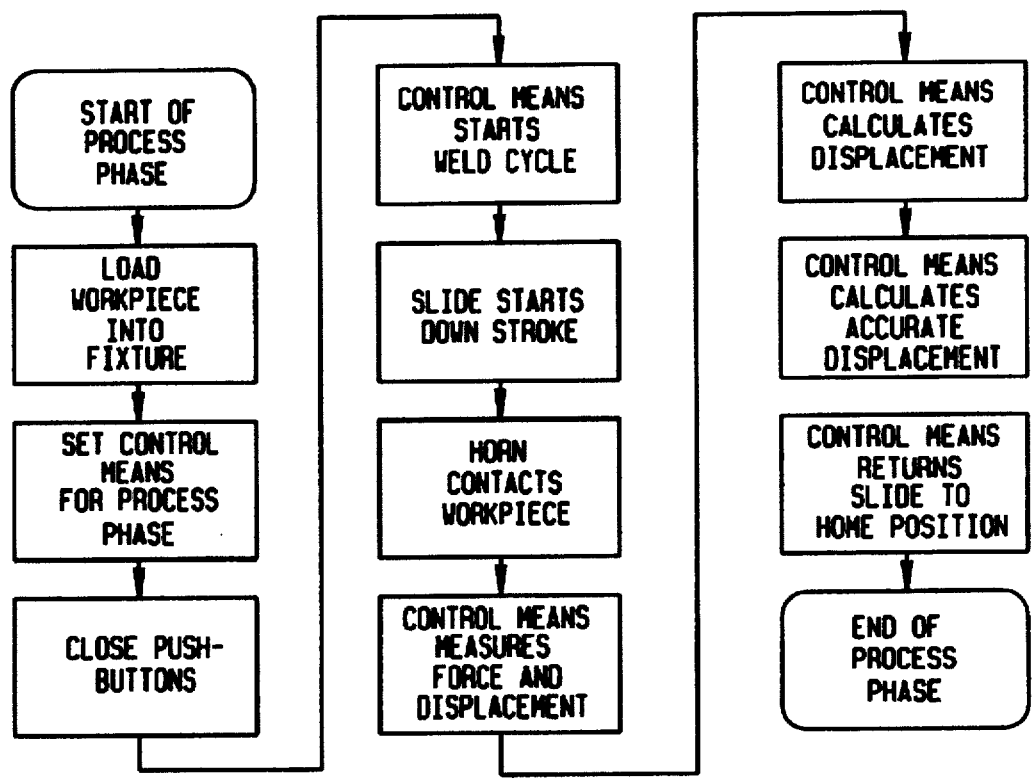
FIG. 8 is a flow diagram setting forth the steps occurring during the processing phase of a workpiece.

For processing a workpiece, the selector switch 58 of the control means 56 is changed to "P". The steps shown in the flow diagram per FIG. 8 will now apply. During this processing phase, see FIG. 9, the force responsive signal, conductor 64, from the force sensing means 50 becomes an input (address) signal to the RAM circuit 72 for retrieving the force related and stored displacement signal obtained during the calibration phase. This retrieved signal is inputed as a correction signal to an adding circuit 74. The adding circuit also receives the current displacement responsive signal, conductor 66, which signal during the processing phase comprises the sum of the workpiece displacement (collapse) and the welding apparatus displacement. The adding circuit subtracts the apparatus related displacement value from the now incoming total displacement value, thereby producing a value indicative of the actual collapse of the workpiece. The signal along conductor 76, therefore, is a "real time" value of the collapse as it occurs. If the signals processed in the adding circuit are in digital form, the adding circuit will be controlled by clock signals to cyclically recalculate the true collapse distance of the workpiece as it occurs in real time, for instance at a frequency of 1 kHz.

Figure 9:
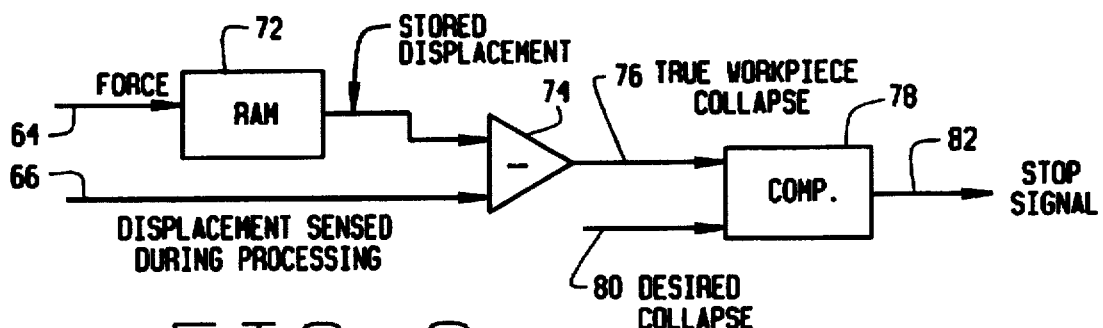
FIG. 9 is a schematic electrical circuit block diagram.

In the event that processing of the workpiece is to terminate when a certain dimension or collapse is achieved, there is provided, FIG. 9, a comparator 78 which receives the workpiece true collapse signal, conductor 76, and a desired collapse value, conductor 80. When coincidence occurs, an output signal on conductor 82 is used to stop the vibrations to the workpiece, thereby permitting the thermoplastic material to solidify and causing the end of the processing phase. In this manner true process control of the collapse distance is achieved.

It will be apparent that this invention is applicable also to vibration welding apparatus wherein two parts of a workpiece are mated along a common interface surface and at least one part is subjected to vibrations while both parts are in forced engagement with one another. Responsive to the dissipation of frictional energy, thermoplastic material softens and flows, and a joint is achieved upon the cessation of the vibrations. Welding apparatus of this type, typically, operate with vibrations in the range from 100 to 1,000 vibrations per second. A typical vibration welder providing translating motion is disclosed in U.S. Pat. No. 3,920,504 dated Nov. 18, 1975 issued to A. Shoh et al. A similar vibration welding apparatus providing orbital motion is shown in U.S. Pat. No. 5,160,393 dated Nov. 3, 1992, issued to E. A. Snyder. With both apparatus the workpiece undergoes a collapse due to a softening and flowing of thermoplastic material while the parts are in compressive forced engagement with one another.

Figure 4C:
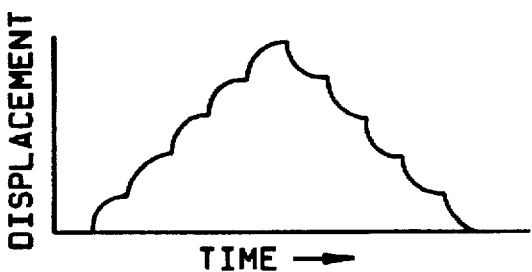

The increase and decrease in pressure versus time is shown in FIG. 4 as being performed in stepped increments. It will be quite apparent that the same measurements may be accomplished also by varying the pressure on a continuous basis. It will be apparent, moreover, that when only a single engagement pressure setting is used during the processing phase, determination of the displacement of the press portions can be confined to that single pressure.

While there has been described and illustrated a preferred embodiment of this invention and certain changes and modifications have been indicated, it will be apparent to those skilled in the art that various further modifications can be made without departing from the broad principle of this invention, which shall be limited only by the scope of the appended claims.

What is claimed is:

1. The method of processing a thermoplastic workpiece by disposing the workpiece between a substantially stationary support and an oppositely disposed movable slide provided with an electroacoustic converter and horn which, responsive to the motion of the slide, is adapted to be in forced engagement with the workpiece for causing responsive to the dissipation of vibratory energy provided by said horn to the workpiece a softening and flowing of thermoplastic material of the workpiece and, hence, a collapse of the workpiece, the steps of:

initiating a calibration procedure comprising:

disposing a workpiece or one substantially representative of the workpiece to be processed between said support and horn;

without applying said vibratory energy bringing said horn in forced engagement with the workpiece at different pressures within the range at which energy is provided during processing of the workpiece;

providing for each said pressures a set of signals comprising a displacement responsive signal indicative of a relative displacement between said slide and support and a force responsive signal indicative of the force effective upon the workpiece at such respective displacement;

storing said respective pressure responsive displacement signals correlated with the force signals pertaining to said displacement responsive signals;

initiating a processing procedure comprising:

disposing a workpiece to be processed between said support and horn;

bringing said horn into forced engagement with said workpiece;

rendering said horn resonant for causing vibratory energy from said horn to be coupled to the workpiece for effecting a softening and flowing of thermoplastic material of said workpiece;

providing a further set of signals comprising a displacement responsive signal indicative of a relative displacement between said slide and said support during the processing procedure and a force responsive signal indicative of the force effective upon the workpiece at said latter displacement;

using the force responsive signal from said further set to recall a stored displacement responsive signal which is correlated with the substantially identical force responsive signal obtained during the calibration procedure, and subtracting the recalled displacement responsive signal from the displacement responsive signal of said further set to determine the collapse of the workpiece during processing.

2. The method of processing a thermoplastic workpiece as set forth in claim 1, and cyclically subtracting the stored displacement responsive signal from the displacement responsive signal of said further set.

3. The method of processing a thermoplastic workpiece as set forth in claim 1, and terminating the coupling of vibratory energy to said workpiece when the result of subtracting said signals equals a predetermined value.

4. The method of processing a thermoplastic workpiece as set forth in claim 1, storing said signals comprising entering said signals in a two-dimensional random access memory.

5. The method of processing a thermoplastic workpiece as set forth in claim 1, said vibratory energy being in the sonic or ultrasonic frequency range.

6. The method of processing a thermoplastic workpiece as set forth in claim 1, said substantially stationary support and said movable slide forming a part of an ultrasonic welding apparatus.

* * * * *